United States Patent
Tsuruta et al.

(10) Patent No.: US 6,304,547 B1
(45) Date of Patent: Oct. 16, 2001

(54) COMMUNICATION NETWORK SYSTEM AND CONTROLLING OF COMMUNICATION PATH THEREFOR

(75) Inventors: Hidekazu Tsuruta, Tokyo; Kazuo Uwajima, Uenohara-machi, both of (JP)

(73) Assignee: Kabushiki Kaihsa Toshiba, Kawasaki (JP)

(*) Notice: Subject to any disclaimer, the term of this patent is extended or adjusted under 35 U.S.C. 154(b) by 0 days.

(21) Appl. No.: 09/101,509

(22) PCT Filed: Nov. 12, 1997

(86) PCT No.: PCT/JP97/04120

§ 371 Date: Jul. 13, 1998

§ 102(e) Date: Jul. 13, 1998

(87) PCT Pub. No.: WO98/21853

PCT Pub. Date: May 22, 1998

(30) Foreign Application Priority Data

Nov. 12, 1996 (JP) ..................................................... 8-300440

(51) Int. Cl.[7] ........................... G01R 31/08; G06F 11/00; G08C 15/00; H04J 1/16; H04J 3/16
(52) U.S. Cl. .......................... 370/224; 370/228; 370/238; 370/248; 370/468
(58) Field of Search ..................................... 370/224, 248, 370/216, 251, 252, 247, 241, 228, 217, 221, 225, 351; 359/117, 115, 158

(56) References Cited

U.S. PATENT DOCUMENTS

| | | | |
|---|---|---|---|
| 5,146,452 | * 9/1992 | Pekarske | 370/16 |
| 5,590,119 | * 12/1996 | Moran et al. | 370/225 |
| 5,862,125 | * 1/1999 | Russ | 370/228 |
| 5,999,286 | * 12/1999 | Venkatesan | 359/117 |
| 6,038,237 | 3/2000 | Tsuruta et al. . | |
| 6,044,064 | * 3/2000 | Brimmage et al. | 370/248 |
| 6,130,876 | * 10/2000 | Chaudhuri | 370/228 |

* cited by examiner

*Primary Examiner*—Wellington Chin
*Assistant Examiner*—M. Phan
(74) *Attorney, Agent, or Firm*—Finnegan, Henderson, Farabow, Garrett & Dunner L.L.P.

(57) ABSTRACT

In case of a trouble in any unit network of a communications network system which comprises a plurality of unit networks, communications are relieved and reliability of communications is improved. The respective unit networks are connected through internetwork connection circuits, and communications are normally made on each unit network by a communication path formed by performing loopback of remote communication devices at both ends of the individual unit network. If a trouble such as a disconnection fault occurred in a certain unit network, the loopback of the internetwork connection circuit of the remote communication devices at both ends of the unit network having the trouble is relieved to form an alternate communication path, and this alternate communication path is used to keep the communications between local communication terminals adjacent to the troubled spot.

12 Claims, 11 Drawing Sheets

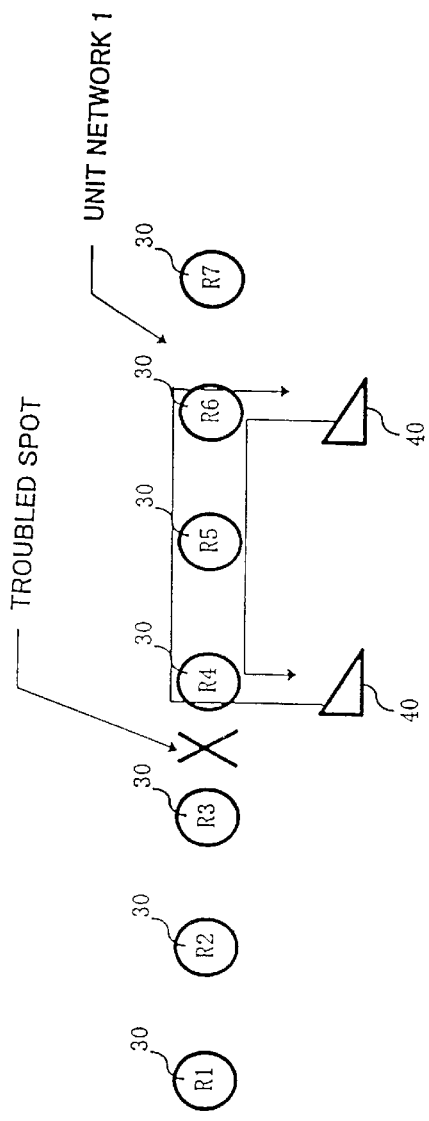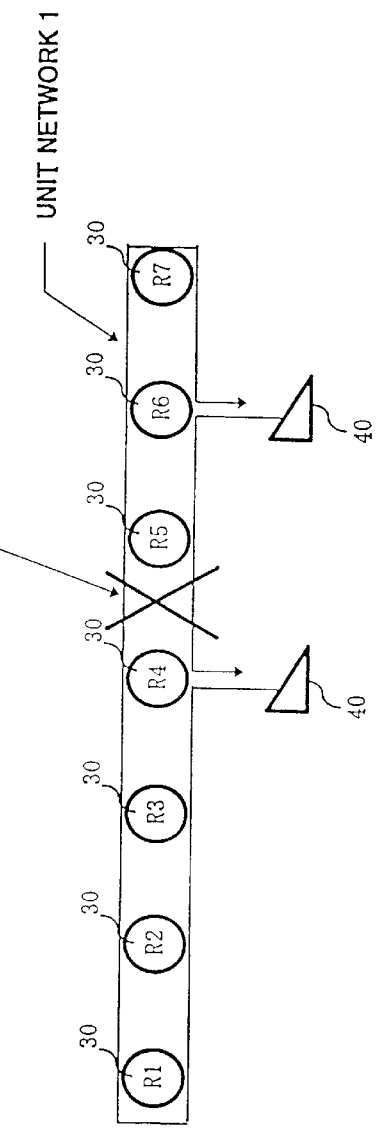

COMMUNICATION NETWORK SYSTEM AND CONTROLLING OF COMMUNICATION PATH THEREFOR

TECHNICAL FIELD

The invention relates to a method for controlling a communication path in a communication network system including a plurality of unit network, each of which, as a basic unit, has a plurality of communication devices accommodating a single or plurality of local communication terminals and which are connected through a single communication path, in which if a trouble such as a line disconnection took place within a certain unit network, an alternate communication path running via other unit network is formed to relieve communications between local communication terminals adjacent to the troubled point.

BACKGROUND ART

For example, in the fields of railroad control, road control and the like, in order to know the operating conditions of signals and crossings or traffic density on roads, there is used a system in that communication terminals which monitor such conditions and transmit the monitored results are located at respective monitoring spots, and the monitored results are collected from the respective communication terminals (monitoring terminals) and used to control.

A known example of the connection style of such a type of control system is a network, which connects a plurality of communication devices accommodating a single or plurality of local communication terminals through a path according to an ATM (asynchronous transfer mode) switching method to transmit/receive information among the respective local communication terminals through the above path via the corresponding communication device. The individual local communication terminal is located at each monitoring spot to serve as a monitoring terminal to make monitoring and transmit the monitored results.

Besides, development is being made these days on a system which has the above-described network determined as a basic unit and has a connection style to accommodate such a unit network in multiple numbers. FIG. 11 is a schematic diagram showing an example of such a connection style of a conventional communications network system, which consists of a unit network 1 and a unit network 2. In the respective unit networks 1, 2, reference numeral 30 denotes remote communication devices (divided into R1 through R7 and R8 through R14 for convenience of description). And, they are connected in a bus configuration through a path according to, for example, the ATM communication method. And, these remote communication devices 30 accommodate a single or plurality of local communication terminals 40, respectively.

In the aforementioned conventional communications network system, the unit networks 1, 2 independently form a communication connection. And they are generally not connected physically even if they are adjacent to each other. Therefore, if a trouble such as a line breakage occurred in the unit network 1, an alternate path running via the other unit network 2 could not be used to relieve communications between local communication terminals 40 which are adjacent to the troubled spot.

For example, it is assumed that a disconnection fault (marked X) occurs between the remote communication device R3 and the remote communication device R4 as shown in FIG. 12 when the local communication terminal 40 connected to the remote communication device R4 and the local communication terminal 40 connected to the remote communication device R6 are communicating normally in the unit network 1 as shown in FIG. 11. Then, the communication route of the local communication terminal 40 connected to the remote communication device R4 and the local communication terminal 40 connected to the remote communication device R6 is changed as shown FIG. 12, so that communications between the local communication terminal 40 connected to the remote communication device R4 and the local communication terminal 40 connected to the remote communication device R6 can be relieved. However, if the aforementioned trouble (disconnection fault between R3 and R4) occurred while communicating between the local communication terminal 40 connected to the remote communication device R2 and the local communication terminal 40 connected to the remote communication device R5, the communications between the remote communication device R2 and the remote communication device R5 are lost due to the disconnection fault. As a result, the local communication terminal 40 connected to the remote communication device R2 and the local communication terminal 40 connected to the remote communication device R5 cannot communicate to each other.

For the same reason, if the unit network 1 had a broken path between the remote communication device R4 and the remote communication device R5 while communications are being made normally between the local communication terminal 40 connected to the remote communication device R4 and the local communication terminal 40 connected to the remote communication device R6 as shown in FIG. 11, no communications can be made between the local communication terminal 40 connected to the remote communication device R4 and the local communication terminal 40 connected to the remote communication device R6 because of the troubled spot (marked X) as shown in FIG. 13.

Thus, the aforementioned conventional communications network system having the connection style accommodating a plurality of unit networks does not link neighboring unit networks physically. Therefore, if one unit network had a trouble such as a disconnection fault, alternate communications cannot be made via another unit network, and communications between the local communication terminals adjacent to the troubled spot are disabled, resulting in degrading the reliability of communications.

In view of the circumstances described above, it is an object of the present invention to provide a communications network system and a method for controlling its communication path, that the disadvantages described above are remedied and if a trouble occurred in a unit network, an alternate path running via another unit network can be formed to relieve communications between local communication terminals adjacent to the troubled spot, and reliability of communications can be improved.

The invention also aims to provide a communications network system and a method for controlling its communication path, which are effective to relieve communications in case of a trouble in any one of unit networks forming a bus type connection to connect respective communication devices to a path.

Besides, the invention aims to provide a communications network system and a method for controlling its communication path, which are suitable to relieve communications in case of a trouble in a unit network when a path connecting respective communication devices within the unit network comprises a circuit according to an ATM communication method.

SUMMARY OF THE INVENTION

The invention of claim 1 relates to a communications network system including a plurality of unit networks wherein a plurality of communication devices, which respectively accommodate a single or plurality of local communication terminals, are connected through a single communication path to communicate among the respective local communication terminals through the communication path via corresponding communication devices, characterized in that the communications network system comprises: internetwork connection circuits provided among the unit networks; trouble detecting means for detecting a trouble occurred in the respective unit networks; and alternate communication path forming means which, when a trouble is detected by the trouble detecting means, connects a communication path of a first unit network having the trouble to a communication path of a second unit network which is adjacent thereto through the internetwork connection circuits to form an alternate communication path bridging to the second unit network between two communication devices adjacent to a troubled spot within the first unit network.

The invention of claim 2 relates to the communications network system according to claim 1, wherein the unit network is configured by a bus type network having the respective communication devices connected to the communication path in a bus configuration, and the internetwork connection circuits comprise a pair of lines connecting the communications devices at both ends of the respective unit network.

The invention of claim 3 relates to the communications network system according to claim 2, wherein the alternate communication path forming means comprises loopback control means, which makes the communication path to loopback within two communication devices adjacent to the troubled spot in the first unit network and releases the loopback of the communication path with respect to a internetwork connection circuit corresponding to each of at least the communication devices at both ends of the first unit network and the pair of internetwork connection circuits.

The invention of claim 4 relates to the communications network system according to claim 2, wherein the alternate communication path forming means comprises path replacement control means for replacing the communication path so that when the trouble has occurred within the first unit network, the communication devices at both ends of the first unit network and the second unit network are respectively connected by the pair of internetwork connection circuits and the communication devices at the both ends of the first unit network are respectively connected to two communication devices which have the troubled spot therebetween.

The invention of claim 5 relates to the communications network system according to claim 1, wherein the communication path in the unit network and the internetwork connection circuit are configured by an asynchronous transmission mode communication circuit.

The invention of claim 6 relates to the communication network system according to claim 5, wherein a half of an entire band of the asynchronous transmission mode communication circuit is used to form a communication path of non-alternating route, and the other half of the band is used to form the alternate communication path.

The invention of claim 7 relates to a method for controlling a communication path of a communications network system including a plurality of unit networks wherein a plurality of communication devices, which respectively accommodate a single or plurality of local communication terminals, are connected through a single communication path to communicate among the local communication terminals through the communication path via corresponding communication devices, characterized in that the method comprises the steps of: providing internetwork connection circuits between the unit networks; detecting a trouble occurred in the respective unit networks; and when the trouble is detected, connecting a communication path of a first unit network having the trouble to a communication path of a second unit network which is adjacent thereto through the internetwork connection circuits to form an alternate communication path bridging to the second unit network between two communication devices adjacent to the troubled spot within the first unit network.

The invention of claim 8 relates to the method for controlling a communication path of a communications network system according to claim 7, wherein the unit network is configured by a bus type network having the respective communication devices connected to the communication path in a bus configuration, and the internetwork connection circuits comprise a pair of lines connecting the communications devices at both ends of the respective unit networks.

The invention of claim 9 relates to the method for controlling a communication path of a communications network system according to claim 8, wherein the step of forming the alternate communication path is carried out by making the path to loopback within two communication devices adjacent to the troubled spot in the first unit network and releasing the loopback of the path with respect to a internetwork connection circuit corresponding to each of at least the communication devices at both ends of the first unit network and the pair of network interconnecting circuits.

The invention of claim 10 relates to the method for controlling a communication path of a communications network system according to claim 8, wherein the step of forming the alternate communication path is carried out by replacing the path so that when the trouble has occurred within the first unit network, the communication devices at both ends of the first unit network and the second unit network are respectively connected by the pair of network interconnecting circuits and the communication devices at the both ends of the first unit network are respectively connected to two communication devices which have the troubled spot therebetween.

The invention of claim 11 relates to the method for controlling a communication path of a communications network system according to claim 7, wherein the communication path in the unit network and the internetwork connection circuit are configured by an asynchronous transmission mode communication circuit.

The invention of claim 12 relates to the method for controlling a communication path of a communications network system according to claim 11, wherein a half of the entire band of the asynchronous transmission mode communication circuit is used to form a communication path of non-alternating route, and the other half of the band is used to form the alternate communication path.

The present invention connects the unit networks physically, and performs loopback of remote communication devices which are generally located at both ends of each unit network, namely connected to another unit network, to communicate in each unit network, thereby preventing data from being transmitted to another unit network. In this state, if a trouble such as a line breakage took place within a single unit network, the loopback of the remote communication devices at both ends of the unit network is relieved to form an alternate path with another unit network, and this alternate path is used to secure communications between the local communication terminals adjacent to the troubled point.

BRIEF DESCRIPTION OF THE DRAWINGS

FIG. 12 is a diagram showing an example of the configuration of a path when a trouble occurs in the communications network system of FIG. 11; and FIG. 13 is a diagram showing another example of the configuration of the path when a trouble occurs in the communications network system of FIG. 11.

BEST MODE FOR CARRYING OUT THE INVENTION

Figure 1:
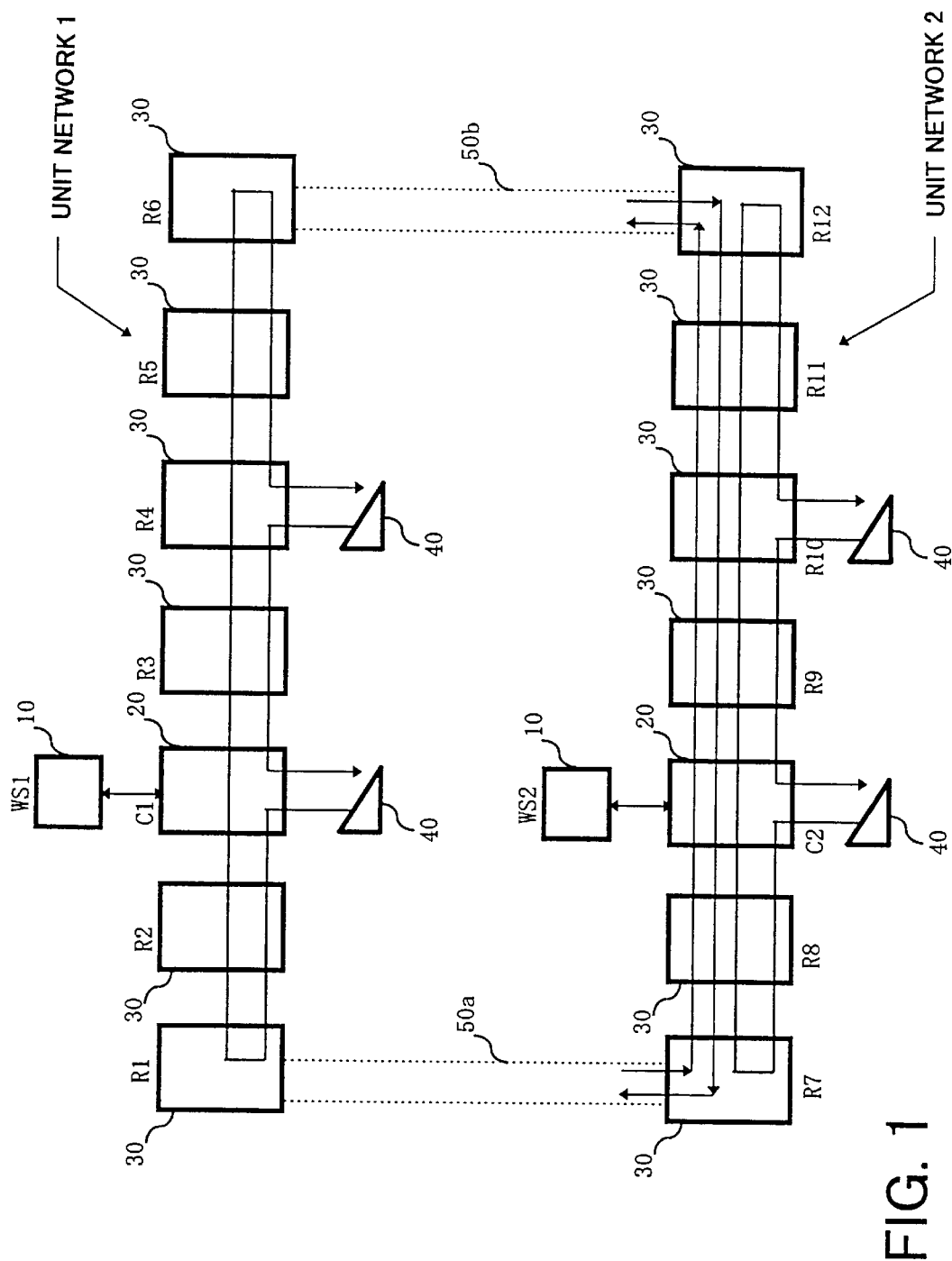
FIG. 1 is a diagram showing a connected configuration of the communications network system according to one embodiment of the invention.

Now, an embodiment of the invention will be described in detail with reference to the accompanying drawings. FIG. 1 is a diagram showing an example of the configuration of connection in the communications network system according to the embodiment of the invention. In this communications network system, a unit network 1 and a unit network 2 are respectively configured by a bus type connection. Specifically, the unit network 1 in this communications network system consists of a network management unit (WS1) 10, a center unit (C1) 20, a plurality of remote communication devices (R1, R2, R3, R4, R5, R6) 30, and a single or plurality of local communication terminals 40 connected to the remote communication devices (R1, R2, R3, R4, R5, R6). And, the center unit (C1) and the remote communication devices (R1, R2, R3, R4, R5, R6) are connected to a path in a bus configuration. This path consists of an ATM path using the circuit according to an ATM communication method. And the ATM communication is also used to communicate between the network management unit (WS1) and the center unit (C1) and between the respective remote communication devices (R1, R2, R3, R4, R5, R6) and the respective local communication terminals 40.

The center unit (C1) in this unit network 1 is a device to collect through the above-described path information sent from the respective local communication terminals 40, which are accommodated in the remote communication device (R1, R2, R3, R4, R5, R6), through those units (R1, R2, R3, R4, R5, R6). And, the network management unit (WS1) is a device to manage the communication of the overall unit network 1 containing the center unit (C1).

Similarly, the unit network 2 consists of a network management unit (WS2) 10, a center unit (C2) 20, a plurality of remote communication devices (R7, R8, R9, R10, R11, R12) 30, and a single or plurality of local communication terminals 40 connected to the remote communication devices (R7, R8, R9, R10, R11, R12). And, the center unit (C2) and the remote communication devices (R7, R8, R9, R10, R11, R12) are connected to a path in a bus configuration. This path consists of an ATM path using the circuit according to the ATM communication method. And the ATM communication is also used to communicate between the network management unit (WS2) and the center unit (C2) and between the respective remote communication devices (R7, R8, R9, R10, R11, R12) and the respective local communication terminals 40.

The center unit (C2) in the unit network 2 is a device to collect through the abode-described path information sent from the respective local communication terminals 40, which are accommodated in the remote communication devices (R7, R8, R9, R10, R11, R12), through these units (R7, R8, R9, R10, R11, R12). And, the network management unit (WS2) is a device to manage the communication of the overall unit network 2 containing the center unit (C2).

Besides, the communications network system of the invention has a characteristic configuration that among the remote communication devices (R1), (R6) at both ends of the unit network 1 and the remote communication devices (R7), (R12) at both ends of the neighboring unit network 2, (R1) is linked to (R7), and (R6) is linked to (R12) through network interconnecting circuits 50a and 50b, respectively.

This communications network system has a U-plane and a C-plane. The U-plane transmits data among the remote communication devices 30, performs or releases loopback in case of a trouble, while the C-plane connects a CPU of the network management unit WS1 or WS2 to a CPU of the individual remote communication device 30 to give an instruction to release the loopback.

Figure 6:
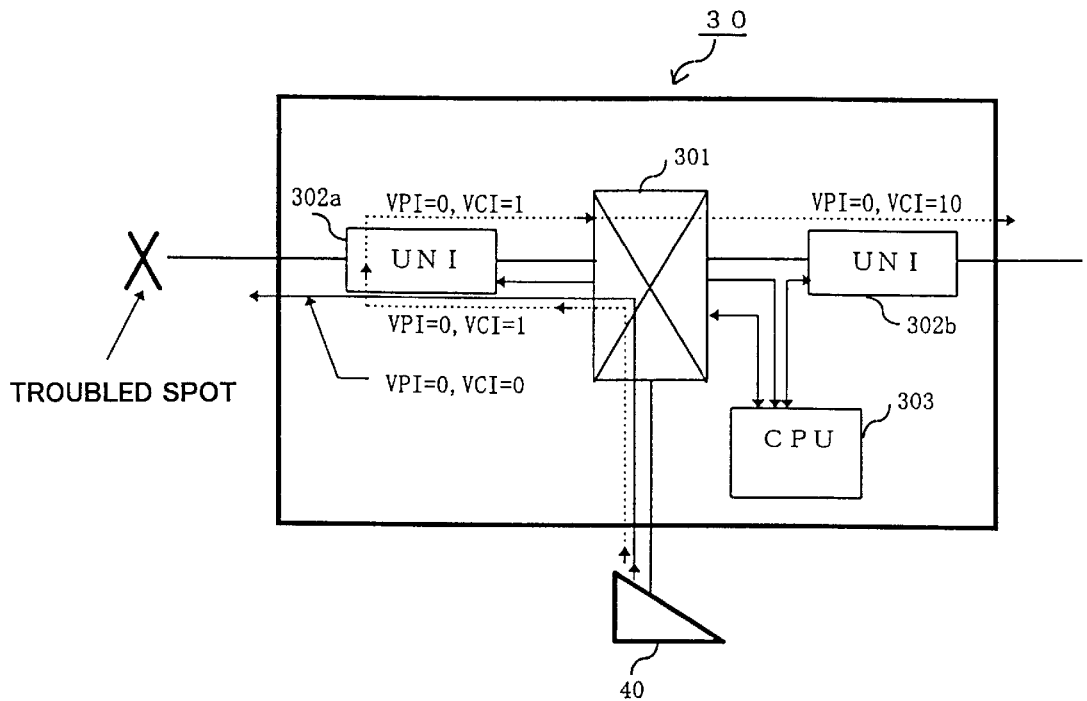
FIG. 6 is a diagram showing an example of controlling loopback when a trouble occurs in a remote communication terminal according to the invention.
Figure 7:
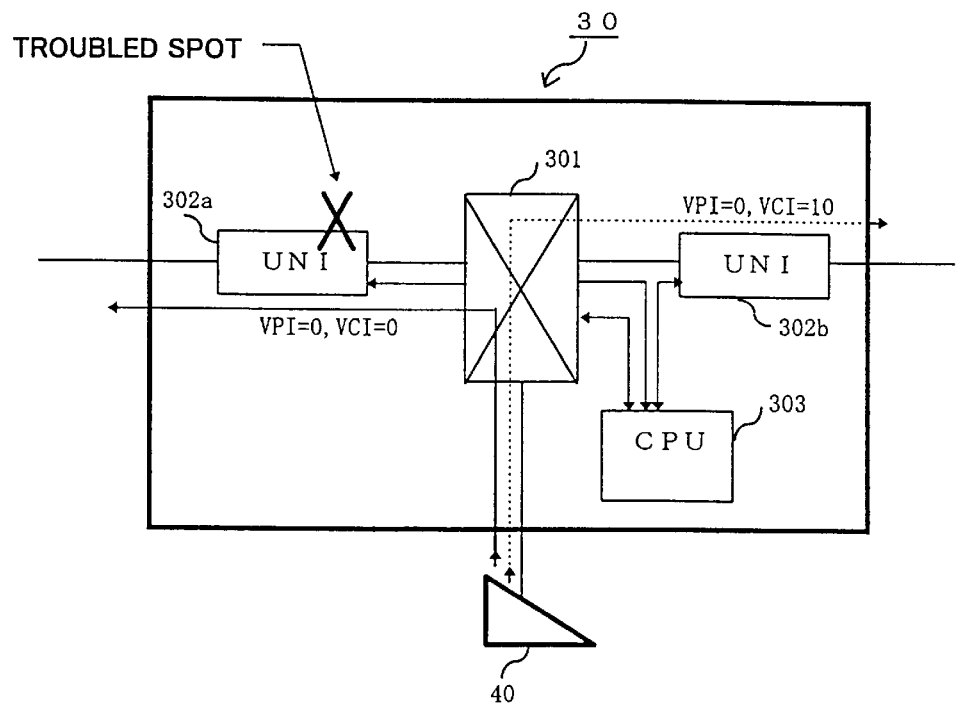
FIG. 7 is a diagram showing another example of controlling loopback when a trouble occurs in a remote communication terminal according to the invention.

The remote communication devices (R1, R6, R7, R12) at both ends of the unit networks 1, 2 have a switch means with a functional configuration to be described afterwards (see FIG. 6 and FIG. 7). The switch means is normally controlled into a loopback condition by the U-plane to loopback the path so that data is not transmitted mutually to the destination unit networks. And, the remote communication devices (R2, R3, R4, R5) or (R8, R9, R10, R11), which are not disposed at both ends of the unit network 1 or the unit network 2, have basically the same configuration as the above-described remote communication devices (R1, R6, R7, R12). But the remote communication devices (R2, R3, R4, R5) or (R8, R9, R10, R11) have the switch means normally kept in a non-loopback condition by the U-plane.

Thus, a single communication loop is generally formed in the unit network 1 and the unit network 2 to loopback at both ends by the U-plane to transmit data among the remote communication devices 30 in the individual unit network.

For example, to communicate between the local communication terminal 40 connected to the center unit (C1) and the local communication terminal 40 connected to the remote communication device (R4) in the unit network 1, a communication loop is formed as shown in FIG. 1. Data from the local communication terminal 40 connected to the center unit (C1) is delivered to the destination local communication terminal 40 connected to the remote communication device (R4) through a route of the center unit (C1) →the remote communication devices (R2)→(R1)→(R2) →the center unit (C1)→the remote communication devices (R3)→(R4)→(R5)→(R6)→(R5)→(R4). And, data from the local communication terminal 40 connected to the remote communication device (R4) is transmitted through a route of the remote communication devices (R4)→(R3)→the center unit (C1) and delivered to the destination local communication terminal 40 connected to the center unit (C1).

On the other hand, communications between, for example, the local communication terminal 40 connected to the center unit (C2) and the local communication terminal 40 connected to the remote communication device (R10) in the unit network 2 can be also made in the same control as in the unit network 1.

Figure 2:
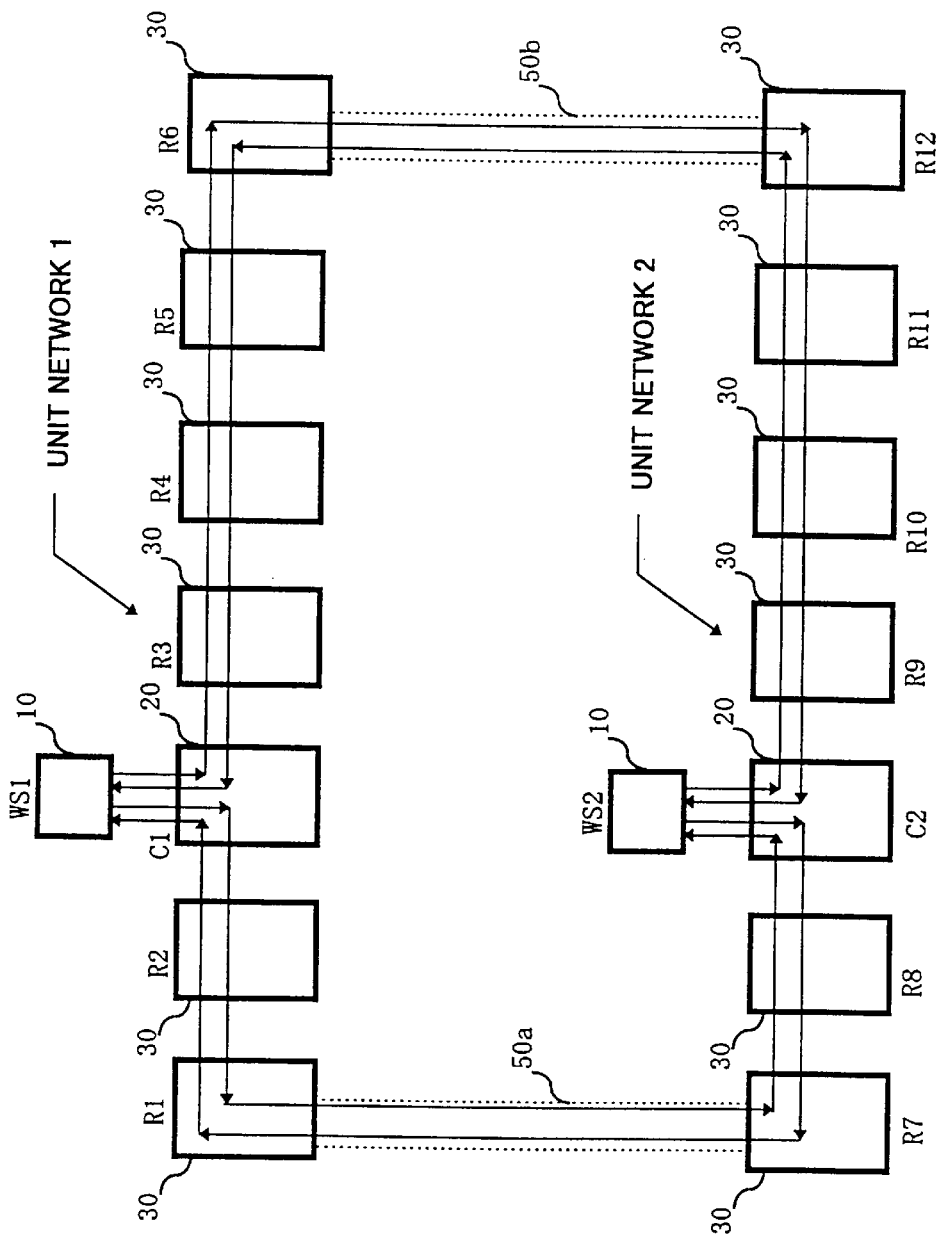
FIG. 2 is a diagram showing the structure of a virtual path used to control the formation of an alternate path for the communications network system of FIG. 1.

When communicating in this normal condition described above, the C-plane forms a virtual path between the network management unit (WS1) of the unit network 1 and the network management unit (WS2) of the unit network 2 so to give an instruction from the individual device to all the center units (C1, C2) and all the remote communication devices (R1 to R6, R7 to R12). FIG. 2 is a conceptual diagram showing an example of the configuration of the virtual path. The network management unit (WS1) of the unit network 1 and the network management unit (WS2) of the unit network 2 can have a conversation mutually through the network interconnecting circuits 50a and 50b.

Figure 3:
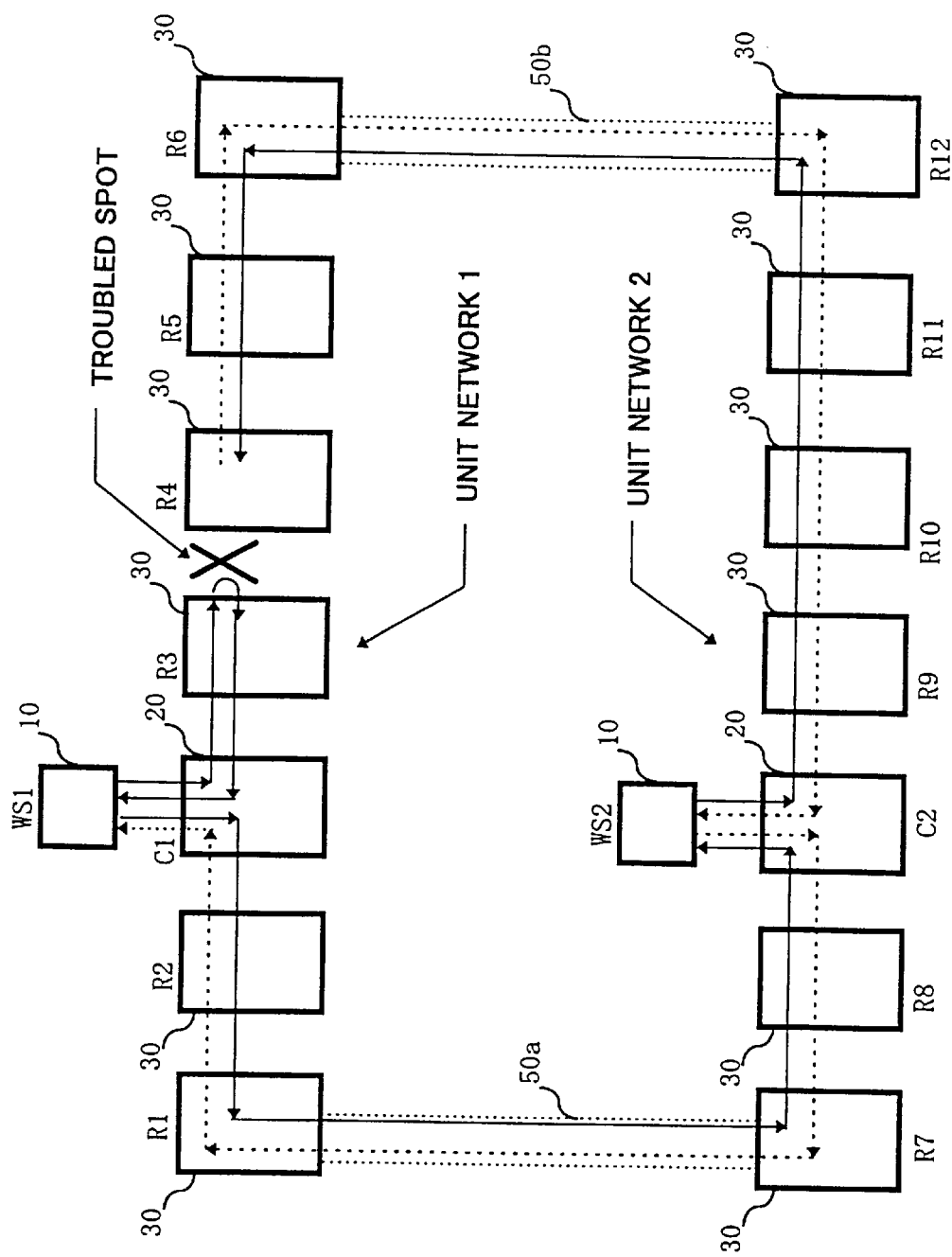
FIG. 3 is a diagram showing the operation of the virtual path of FIG. 2 having a trouble.

In the aforementioned communication condition, if the circuit were broken (indicated by a mark X) between the remote communication devices (R3) and (R4) in the unit network 1, the virtual path is used to notice the occurrence of the trouble through a route of the remote communication device (R3)→the center unit (C1)→the network management unit (WS1) as shown in FIG. 3. The occurrence of trouble can be noticed by, for example, the remote communication device (R3), which recognizes no reception of data from the remote communication device (R4), changeovers its switch means to change the circuit into a loopback state and sends a trouble occurrence notification cell to the network management unit (WS1) through the virtual path (R3→C1).

Upon receiving the notification, the network management unit (WS1) gives an instruction to replace the path of the U-plane to the remote communication device (R1) at one end and the network management unit (WS2) of the unit network 2 through the virtual path.

The remote communication device (R1) having received the instruction from the network management unit (WS1) releases the loopback of the circuit by its switch means and controls to connect the circuit to the network interconnecting circuit 50a.

Meanwhile, the network management unit (WS2) in the unit network 2 receives the instruction from the network management unit (WS1) and gives an instruction to replace the path of the U-plane to the remote communication device (R7) at one end, the remote communication device (R12) at the other end and the remote communication device (R6) at one end of the unit network 1 through the virtual path.

Upon receiving the instruction from the network management unit (WS2), the remote communication device (R7), the remote communication device (R12) and the remote communication device (R6) of the unit network 1 release the loopback of the circuit by their switch means and controls so to connect the circuit to the network interconnecting circuit 50a or 50b.

On the other hand, the remote communication device (R4: the device next to the troubled spot) of the unit network 1 receives the instruction to replace the path of the U-plane from the network management unit (WS2) and controls the circuit, which was kept in the non-loopback condition, into a loopback condition in reverse of the remote communication devices (R1), (R6) and (R7). (R12) at both ends of the unit network 1 and the unit network 2.

Figure 4:
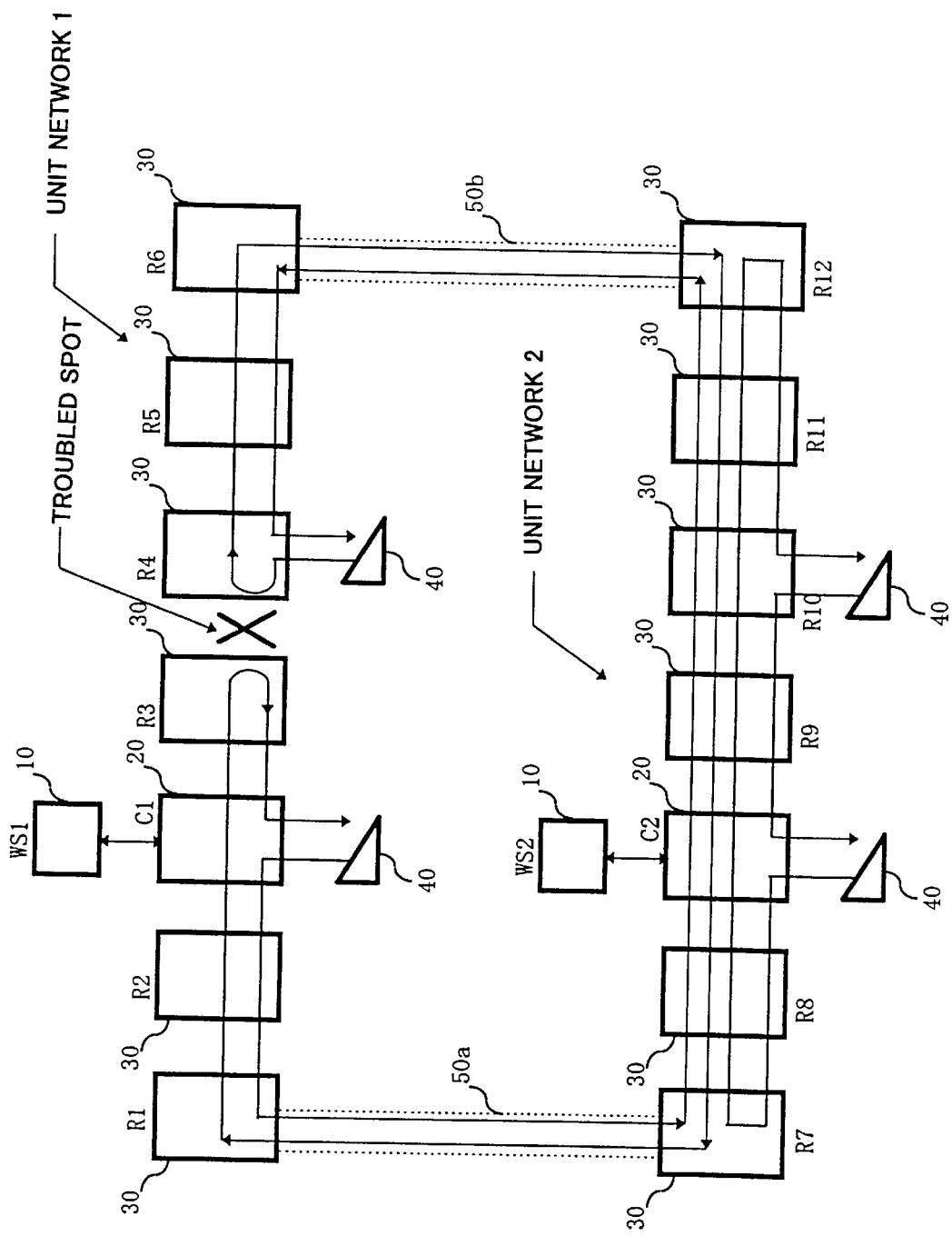
FIG. 4 is a diagram showing the configuration of an alternate path when the communications network system of FIG. 1 has a trouble.

By the above-described series of control, an alternate path is formed on the U-plane between the local communication terminal 40 connected to the center unit (C1) in the unit network 1 and the local communication terminal 40 connected to the remote communication device (R4) as shown in FIG. 4. Specifically, if the circuit between the remote communication devices (R3) and (R4) were broken when the local communication terminal 40 connected to the center unit (C1) and the local communication terminal 40 connected to the remote communication device (R4) are mutually communicating in the unit network 1, the loopback control is performed on the respective circuits of the remote communication devices (R3) and (R4) which are adjacent to the broken point (marked X) of the circuit; the loopback is released by the remote communication devices (R1), (R6) at both ends of the unit network 1 and the remote communication devices (R7), (R12) at both ends of the unit network 2 to control the replacement of the path; and an alternate path is established between the local communication terminal 40 connected to the center unit (C1) and the local communication terminal 40 connected to the remote communication device (R4) so to link the unit network 1 and the unit network 2.

Thus, data from the local communication terminal 40 connected to the center unit (C1) in the unit network 1 is delivered to the destination local communication terminal 40 connected to the remote communication device (R4) through a route of the center unit (C1) in the unit network 1→the remote communication devices (R2)→(R1)→the network interconnecting circuit 50a→the remote communication devices (R7)→(R8) in the unit network 2→the center unit (C2)→the remote communication devices (R9)→(R10)→(R11)→(R12)→the network interconnecting circuit 50b→the remote communication devices (R6)→(R5)→(R4) in the unit network 1 as shown in FIG. 4.

Conversely, data from the local communication terminal 40 connected to the remote communication device (R4) in the unit network 1 is delivered to the destination local communication terminal 40 connected to the center unit (C1) through a route of the remote communication devices (R4)→(R5)→(R6) in the unit network 1→the network interconnecting circuit 50b →the remote communication devices (R12)→(R11)→(R10)→(R9) in the unit network 2→the center unit (C2)→the remote communication devices (R8) →(R7)→the network connecting circuit 50a→the remote communication devices (R1)→(R2) in the unit network 1→the center unit (C1)→the remote communication device (R3)→the center unit (C1) as shown in FIG. 4.

Figure 5:
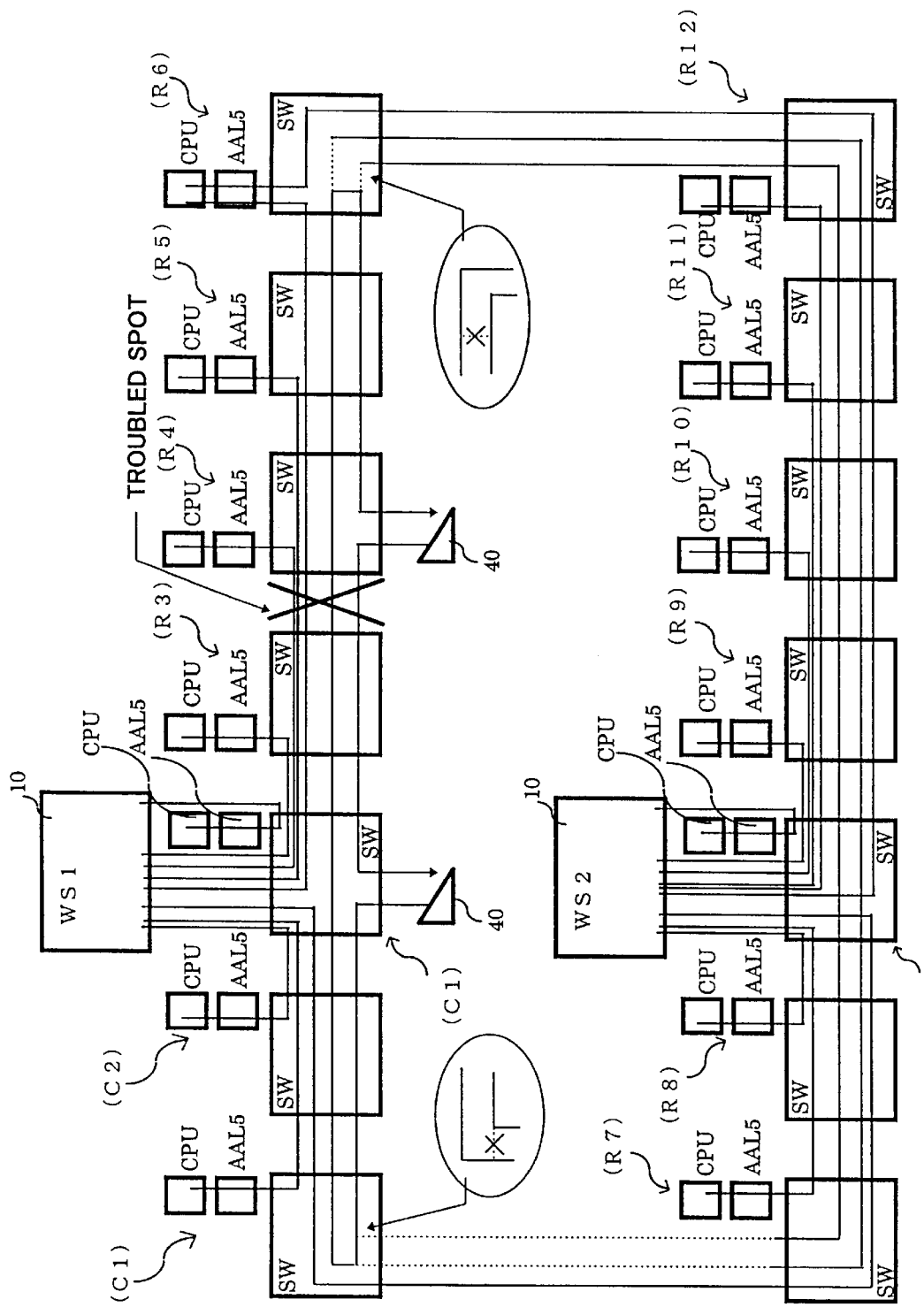
FIG. 5 is a diagram showing a modification of the virtual path used to control the formation of an alternate path for the communications network system of FIG. 1.

A modified virtual path of the C-plane in the communications network system of the invention will be described. FIG. 5 is a conceptual diagram showing an example of the configuration of the modified virtual path. As shown in the drawing, the virtual path is provided so that when communicating in the normal state (free from the trouble indicated by the mark X), the network management unit (WS1) and the respective remote communication devices (R1), (R2), (R3), (R4), (R5), (R6) can communicate to one another through the center unit (C1) of the unit network 1, and the network management unit (WS2) and the respective remote communication devices (R7), (R8), (R9), (R10), (R11), (R12) can communicate to one another through the center unit (C2) of the unit network 2. Especially, a loopback is not provided for the remote communication devices (R7), (R12) at both ends of the unit network 2 in this case, and the virtual path is provided so that an instruction to release the loopback can be given directly from the network management unit (WS1) of the unit network 1 to all the remote communication devices of the unit networks 1, 2.

In the above-described normal communication, if the circuit between the remote communication devices (R3) and (R4) in the unit network 1 were broken (marked X) as shown in the drawing, the aforementioned virtual path is used to notify the occurrence of trouble through a route of the remote communication device (R3)→the center unit (C1) →the network management unit (WS1). The occurrence of trouble can be notified by, for example, the remote communication device (R3), which recognizes no reception of data from the remote communication device (R4), changeovers its switch means to have the circuit into a loopback state, and sends a trouble occurrence notification cell to the network management unit (WS1) through the virtual path (R3→C1).

Upon receiving the notification, the network management unit (WS1) gives an instruction to replace the path of the U-plane through the aforementioned virtual path to the remote communication device (R1) at one end, the remote communication device (R6) at the other end, and the remote communication device (R4) next to the troubled spot.

After receiving the instruction from the network management unit (WS1), the remote communication devices (R1), (R6) release the loopback of the circuit by their respective switch means, and controls to connect the pertinent circuit to a corresponding one of the network interconnecting circuit 50a or 50b.

On the other hand, the remote communication device (R4: the device next to the troubled spot) of the unit network 1 receives the above-described instruction to replace the path of the U-plane from the network management device (WS1) and controls the circuit which was kept in the non-loopback state into a loopback state in reverse of the remote communication devices (R1), (R6) at both ends of the unit network 1.

By the above-described series of control, an alternate path is formed on the U-plane between the local communication terminal 40 connected to the center unit (C1) in the unit network 1 and the local communication terminal 40 connected to the remote communication device (R4) as shown in FIG. 4 in the same manner as the virtual path configuration shown in FIG. 2 and FIG. 3. The subsequent process for communications using the alternate path is performed in the same way as the case described with reference to FIG. 4.

Operations in that the remote communication devices 30 next to the troubled spot, such as the remote communication devices (R3), (R4) in FIG. 4, detect the trouble such as a circuit breakage and perform loopback will be described with reference to FIG. 6 and FIG. 7. FIG. 6 shows an example of the operation for loopback control when a trouble has occurred outside of the remote communication device 30, and FIG. 7 shows an example of the operation for loopback control when a trouble has occurred inside of the remote communication device 30.

As shown in FIG. 6 and FIG. 7, to deal with the aforementioned loopback control, the remote communication device 30 used in the invention comprises a cell exchange switch 301 for switching cell data, user network interfaces (UNI) 302a, 302b which are disposed at both ends of the cell exchange switch 301 and serve as cell data transmission/receipt interface, and a CPU 303 for controlling the operation of the entire device including the cell exchange switch 301 and the UNIs 302a, 302b.

In the remote communication device 30 configured as described above, if its belonging unit network had a trouble such as a circuit breakage outside of the remote communication device 30 like the remote communication devices (R3) and (R4) of FIG. 4, the CPU 303 detects the trouble, performs loopback on the circuit in the manner as indicated by a dotted line in En FIG. 6, returns at the UNI 302a data coming from the local communication terminal 40 accommodated in the same remote communication device 30 and sends the same data to the circuit on the side opposite to the troubled one. In the drawing, the solid line indicates the flow of normal cell data as distinguished from the flow of cell data when loopback is performed by the cell exchange switch 301 as indicated by the dotted line.

Specifically, the loopback control is performed as follows. Data from the local communication terminal 40 accommodated into the remote communication device 30 is entered into the cell exchange switch 301, cell data having VPI (virtual path identifier)=0 and VCI (virtual connection identifier)=1 is returned at the UNI 302a, and the cell data with VPI=0 and VCI=1 is returned back to the cell exchange switch 301. In the cell exchange switch 301, the cell data with VPI=0 and VCI=1 is converted into cell data with VPI=0 and VCI=10 and sent to the circuit opposite to the broken side via the pertinent UNI 302b. In this case, it is necessary to provide the cell exchange switch 301 with a function in advance so to convert the received cell data with VPI=0 and VCI=1 into cell data with VPI=0 and VCI=10.

On the other hand, if a trouble occurred in, for example, the UNI 302a of the remote communication device 30, the CPU 303 detects the trouble, performs the loopback on the circuit in the manner as indicated by the dotted line in FIG. 7, and sends data being sent from the local communication terminal 40 connected to the remote communication device 30 to the circuit on the side opposite to the troubled UNI 302a. In the drawing, the solid line indicates the flow of the normal cell data distinguished from the flow of cell data, indicated by the dotted line, caused when the loopback is performed by the cell exchange switch 301.

More specifically, in the remote communication device 30 for example, the CPU 303, which has detected the trouble in the UNI 302a, changes the values of VPI=0 and VCI=0 set on the cell exchange switch 301 to the values VPI=0 and VCI=10, and sends data from the local communication terminal 40 which was being flown as the cell data with VPI=0 and VCI=0 to the troubled UNI 302a to the circuit opposite to the troubled UNI 302a as cell data with VPI=0 and VCI=10 via the pertinent UNI 302b.

As a method to detect the above-described circuit breakage or the troubles of UNIs 302a, 302b, there are a method by which the remote communication device 30 recognizes the stop of transmission of cell from the upstream remote communication device 30 as the occurrence of a trouble; a method by which based on a function that only an empty cell can be kept transmitted when a path is normal but an upstream remote communication device 30 has a trouble in its exchange function, reception of no cell excepting an empty cell is recognized as the occurrence of a trouble; a method by which the remote communication device 30 keeps sending a trouble monitoring cell containing information unique to the own device to the downstream remote communication device 30 at a given time interval, and the downstream remote communication device 30 recognizes the stop of a trouble monitoring cell from being sent from the upstream remote communication device 30 as the occurrence of a trouble and other various methods.

The above-described embodiments (FIG. 1 through FIG. 5) cover an alternate path forming method to communicate via all the communication devices 30 in the unit network of the communications network system having a bus type connection form. And, this method can also be applied to communications between specific communication devices 30 in the unit network of the same communications network system.

Figure 8:
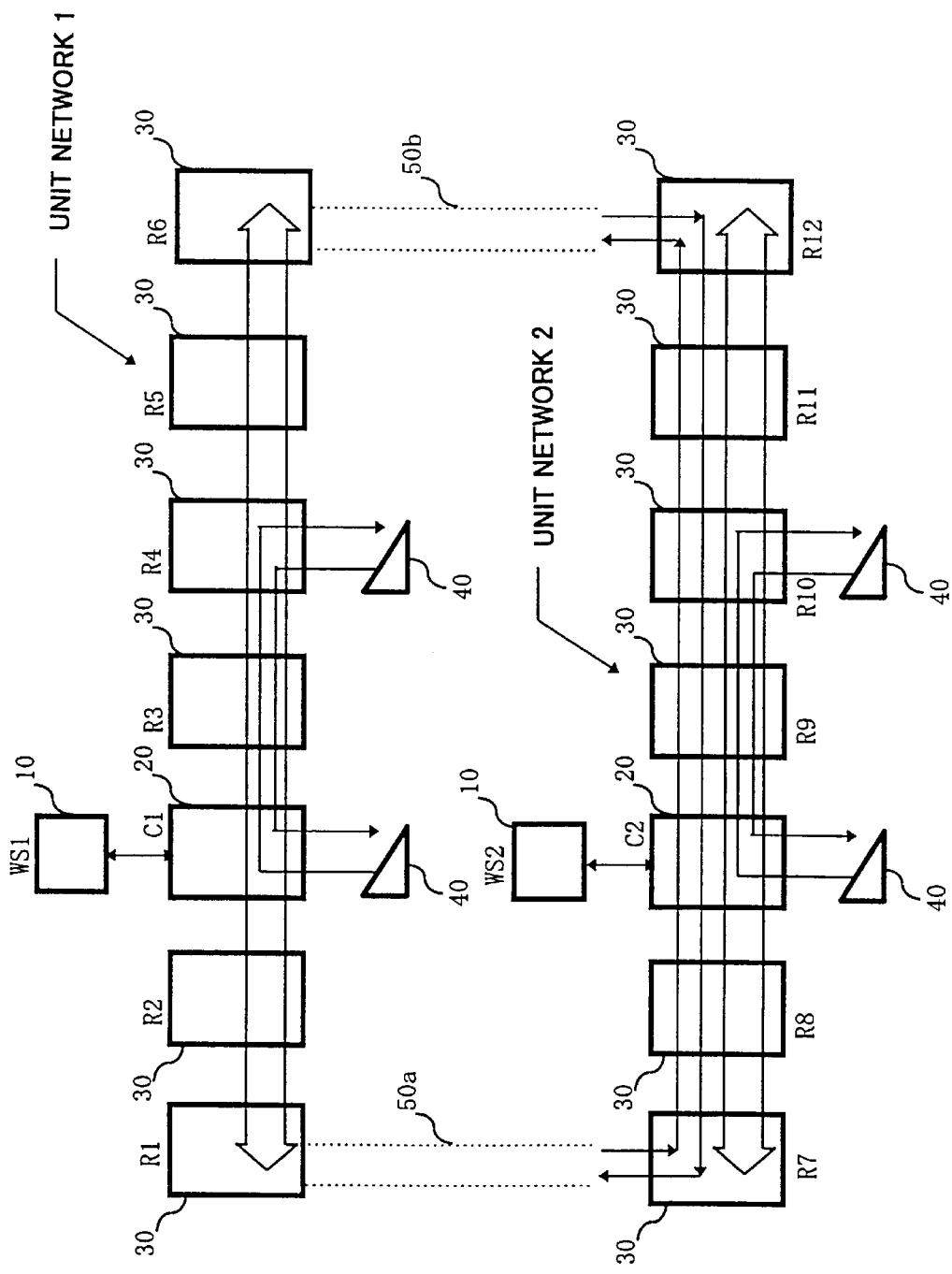
FIG. 8 is a diagram showing a connected configuration of the communications network system according to another embodiment of the invention.

FIG. 8 is a diagram showing a connected configuration for communications between specific communication devices 30 within the unit network in the communications network system according to the invention. In the drawing, the structure has the same basic structure as shown in FIG. 1 in that the center unit 20 and the respective remote communication devices 30 are connected in the form of a bus network within the unit network 1, and the unit network 2 and the unit network 1 and the unit network 2 are connected by the network connecting circuits 50a, 50b.

In this communications network system having the bus type connection, for communications between the local communication terminal 40 connected to the center unit (C1) within the unit network 1 and the local communication terminal 40 connected to the remote communication device (R4), data from the local communication terminal 40 connected to the center unit (C1) is sent through a route of the center unit (C1)→the remote communication devices (R3)→(R4) and delivered to the destination local communication terminal 40 connected to the remote communication device (R4). And, data from the local communication terminal 40 connected to the remote communication device (R4) is transmitted through a route of the remote communication devices (R4)→(R3)→the center unit (C1) and delivered to the destination local communication terminal 40 connected to the center unit (C1).

Figure 9:
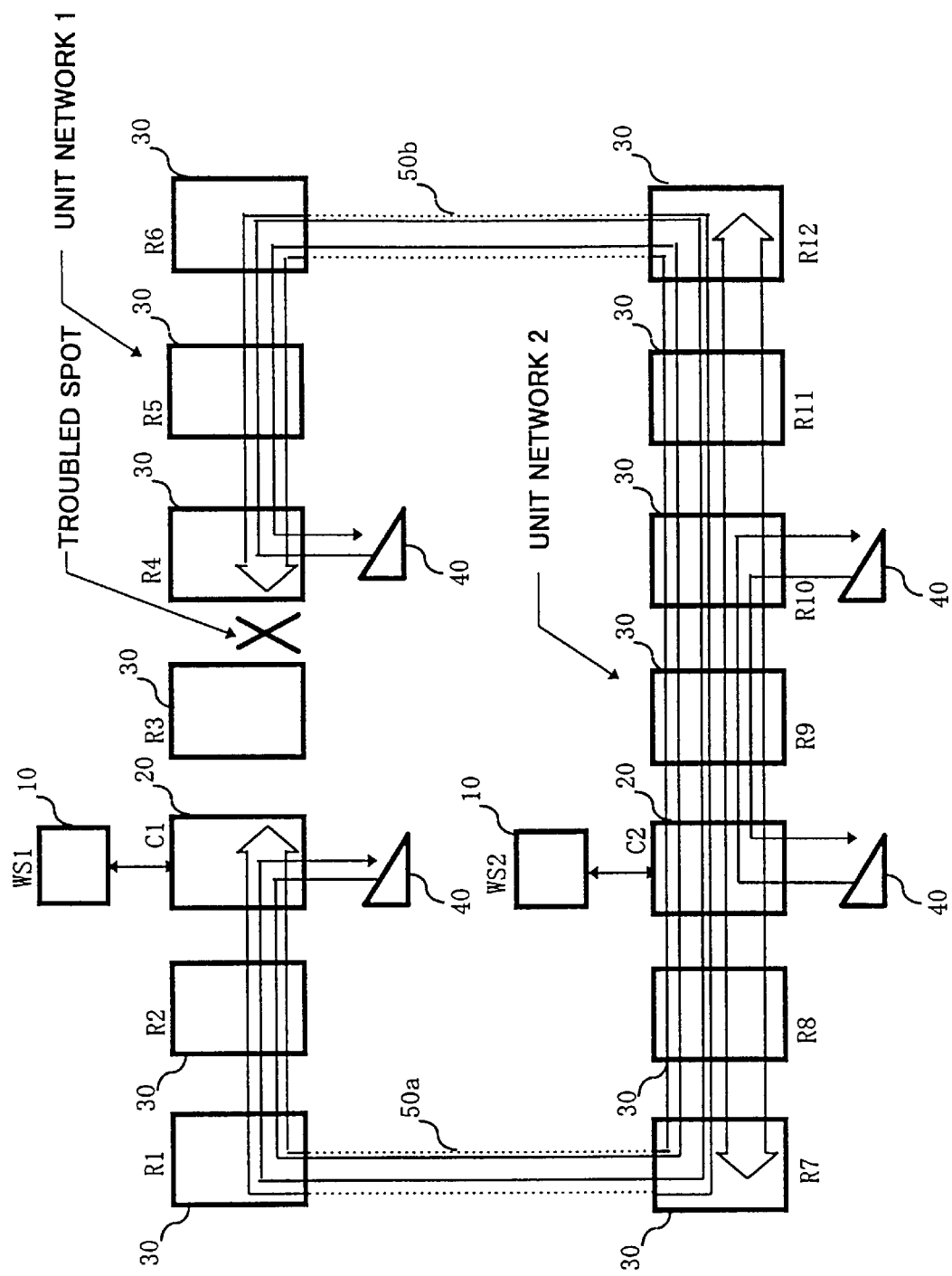
FIG. 9 is a diagram showing an example of the configuration of an alternate path when the communications network system of FIG. 8 has a trouble.

When communicating in this normal state, if the line between the remote communication devices (R3) and (R4) within the unit network 1 were broken, the communication path between the local communication terminal 40 connected to the center device (C1) and the local communication terminal 40 connected to the remote communication device (R4) is changed to the communication path as shown in FIG. 9. Specifically, the remote communication devices (R1), (R6) at both ends of the unit network 1 and the remote communication devices (R7), (R12) at both ends of the unit network 2 are controlled to a loopback release state, the remote communication devices (R1), (R7) are connected by the network interconnecting circuit 50a, the remote communication devices (R6), (R12) are connected by the network interconnecting circuit 50b, and the remote communication devices (R3), (R4) adjacent to the disconnection fault (marked X) of the circuit are controlled to loopback the lines. Thus, an alternate path is formed between the local communication terminal 40 connected to the center device (C1) and the local communication terminal 40 connected to the remote communication device (R4) so to link the unit network 1 and the unit network 2.

In the state described above, data from the local communication terminal 40 connected to the center device (C1) within the unit network 1 is sent through a route of the center device (C1) within the unit network 1→the remote communication devices (R2)→(R1)→the network interconnecting circuit 50a→the remote communication devices (7)→(R8) within the unit network 2→the center unit (C2)→the remote communication devices (R9)→(R10)→(R11)→(R21)→the network interconnecting circuit 50b→the remote communication devices (R6)→(R5)→(R4) of the unit network 1 and delivered to the destination local communication terminal 40 connected to the remote communication device (R4).

Conversely, data from the local communication terminal 40 connected to the remote communication device (R4) within the unit network 1 is sent through a route of the remote communication devices (R4)→(R5)→(R6)→the network interconnecting circuit 50b→the remote communication devices (R12)→(R11)→(R10)→(R9) within the unit network 2→the center device (C2)→the remote communication devices (R8)→(R7)→the network interconnecting circuit 50a→the remote communication devices (R1)→(R2) within the unit network 1→the center device (C1) and delivered to the destination local communication terminal 40 connected to the center device (C1).

Thus, the invention connects physically the unit networks through the network interconnecting circuit, the remote communication devices which are normally positioned at both ends of the individual unit network are made to loopback to form a single path loop to make communications of the individual unit network, and if one unit network had a trouble such as a disconnection fault, the loopback is made at the remote communication terminals adjacent to the troubled spot, and also the loopback at the remote communications devices at both ends is released, to connect to the path of another unit network through the network interconnecting circuit, thereby forming an alternate path, which runs through another unit network, between the local communication terminals connected to the remote communication terminals adjacent to the troubled spot. Therefore, even if a trouble took place within the unit network, communications can be retained using the alternate path running via the normal path of another network, and very highly reliable communications can be achieved.

Figure 10:
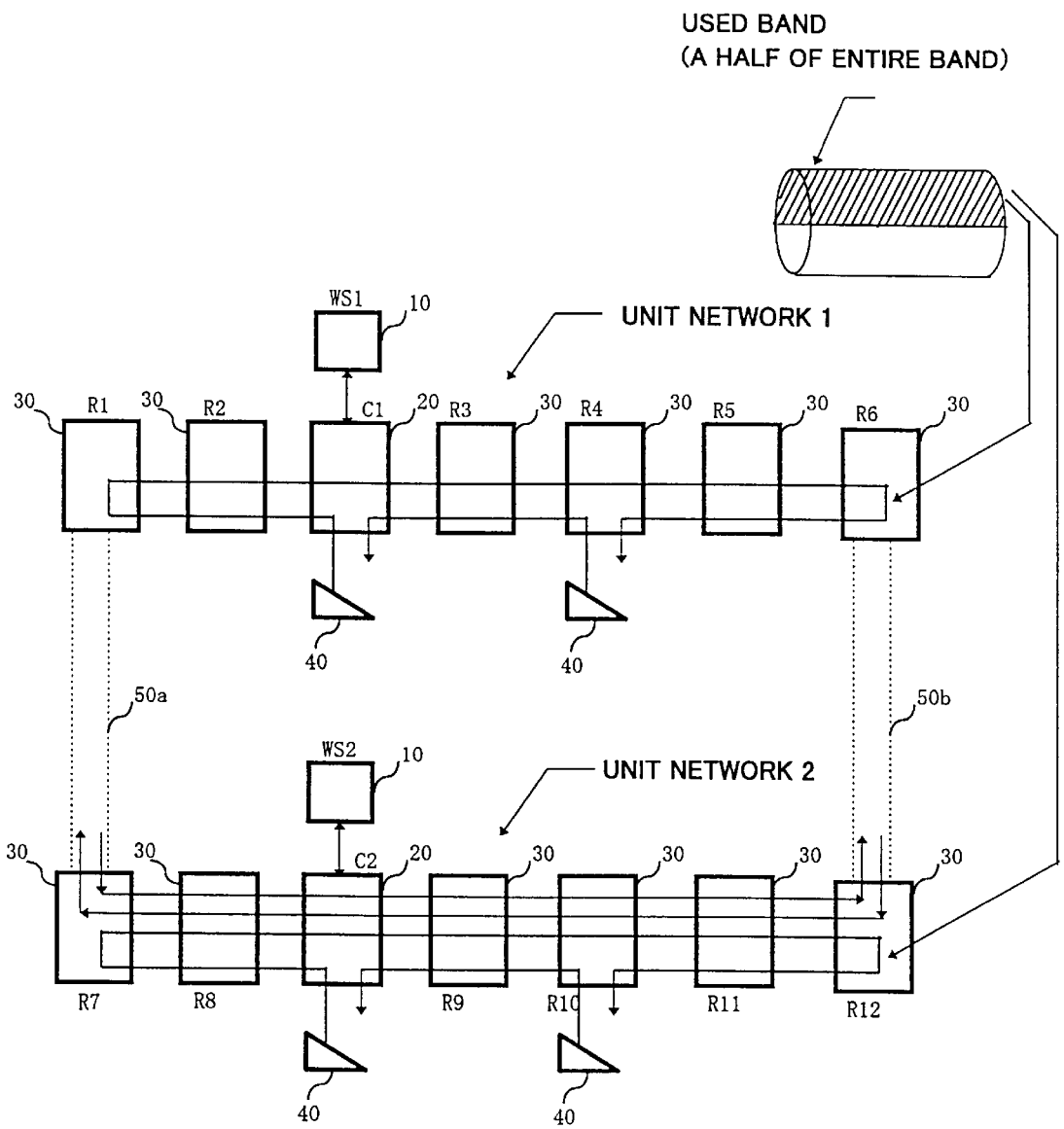
FIG. 10 is a conceptual diagram showing an example of using the band of a path in each unit network according to the invention.
Figure 11:
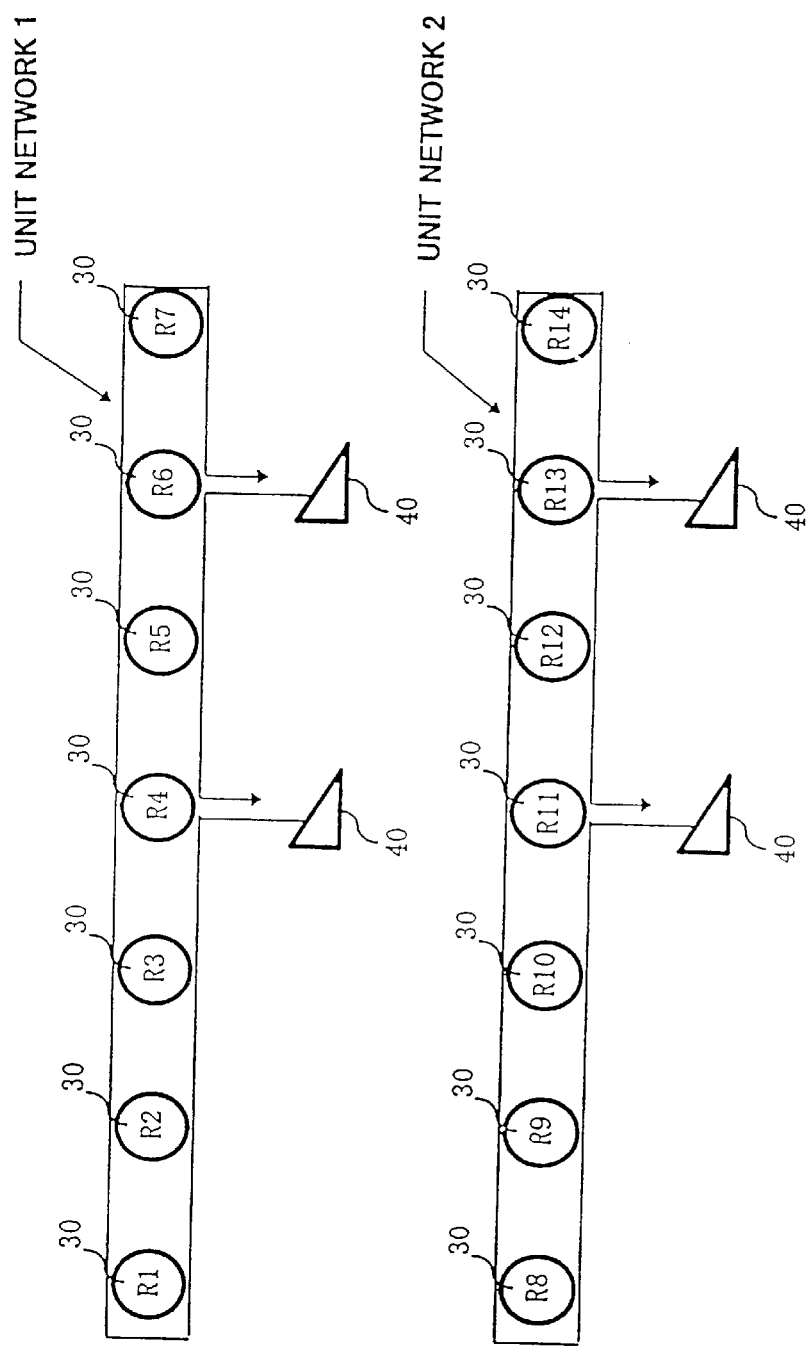
FIG. 11 is a conceptual diagram showing the configuration of connection in a conventional communications network system.

In this case, if a certain unit network had a trouble such as a disconnection fault, the alternate path is basically formed via the path of another unit network, the individual unit network must always secure a band enough to be used as an alternate path by another unit network on a circuit as the path. FIG. 10 is a conceptual diagram showing an example of a band used for the line in each unit network in the loop type connection shown in FIG. 1. In this embodiment, the respective unit networks 1, 2 are designed to operate with the use band (hatched portion in the drawing) reduced to a half of the overall available band.

INDUSTRIAL APPLICABILITY

In case of a trouble within a certain unit network, an alternate path running via the path of another unit network can be used to relieve communications, thereby keeping the reliability of communications. The invention can be applied to a communications network system in general having a plurality of unit networks and local communication terminals dispersed so that information from the respective communication terminals are collected into a center unit through a path via corresponding remote communication devices and particularly useful for a railroad control system and a road control system that an error in collecting monitoring information may be highly possible to result in a serious accident.

What is claimed is:

1. A communications network system including a plurality of unit networks wherein a plurality of communication devices, which respectively accommodate a single or plurality of local communication terminals, are connected through a single communication path to communicate among the respective local communication terminals through the communication path via corresponding communication devices, the communication path being set in each of the unit networks leaving a band to be used for an alternate communication path to respectively carry out the communications, characterized in that the communications network system comprises:

internetwork connection circuits provided among the unit networks;

trouble detecting means for detecting a trouble occurred in the respective unit networks; and alternate communication path forming means which, when a trouble is detected by the trouble detecting means, connects a communication path of a first unit network having the trouble to a communication path in a non-used band of a second unit network which is adjacent thereto through the internetwork connection circuits to form the alternate communication path bridging from the first unit network to the second unit network through the internetwork connection circuits between two communication devices adjacent to a troubled spot within the first unit network.

2. The communications network system according to claim 1, wherein the unit network is configured by a bus type network having the respective communication devices connected to the communication path in a bus configuration, and the internetwork connection circuits comprise a pair of lines connecting the communications devices at both ends of the respective unit network.

3. The communications network system according to claim 2, wherein the alternate communication path forming means comprises loopback control means, which makes the communication path to loopback within two communication devices adjacent to the troubled spot in the first unit network and releases the loopback of the communication path with respect to a internetwork connection circuit corresponding to each of at least the communication devices at both ends of the first unit network and the pair of internetwork connection circuits.

4. The communications network system according to claim 2, wherein the alternate communication path forming means comprises path replacement control means for replacing the communication path so that when the trouble has occurred within the first unit network, the communication devices at both ends of the first unit network and the second unit network are respectively connected by the pair of internetwork connection circuits and the communication devices at the both ends of the first unit network are respectively connected to two communication devices which have the troubled spot therebetween.

5. The communications network system according to claim 1, wherein the communication path in the unit network and the internetwork connection circuit are configured by an asynchronous transmission mode communication circuit.

6. The communication network system according to claim 5, wherein a half of an entire band of the asynchronous transmission mode communication circuit is used to form a communication path of non-alternating route, and the other half of the band is used to form the alternate communication path.

7. A method for controlling a communication path of a communications network system including a plurality of unit networks wherein a plurality of communication devices, which respectively accommodate a single or plurality of local communication terminals, are connected through a single communication path to communicate among the local communication terminals through the communication path via corresponding communication devices, the communication path being set in each of the unit networks leaving a band to be used for an alternate communication path to carry out the communications, characterized in that the method comprises the steps of:

providing internetwork connection circuits between the unit networks;

detecting a trouble occurred in the respective unit networks; and when the trouble is detected, connecting a communication path of a first unit network having the trouble to a communication path in a non-used band of a second unit network which is adjacent thereto through the internetwork connection circuits to form the alternate communication path bridging from the first unit network to the second unit network through the internetwork connection circuits between two communication devices adjacent to the troubled spot within the first unit network.

8. The method for controlling a communication path of a communications network system according to claim 7, wherein the unit network is configured by a bus type network having the respective communication devices connected to the communication path in a bus configuration, and the internetwork connection circuits comprise a pair of lines connecting the communications devices at both ends of the respective unit networks.

9. The method for controlling a communication path of a communications network system according to claim 8, wherein the step of forming the alternate communication path is carried out by making the path to loopback within two communication devices adjacent to the troubled spot in the first unit network and releasing the loopback of the path with respect to a internetwork connection circuit corresponding to each of at least the communication devices at both ends of the first unit network and the pair of network interconnecting circuits.

10. The method for controlling a communication path of a communications network system according to claim 8, wherein the step of forming the alternate communication path is carried out by replacing the path so that when the trouble has occurred within the first unit network, the communication devices at both ends of the first unit network and the second unit network are respectively connected by the pair of network interconnecting circuits and the communication devices at the both ends of the first unit network are respectively connected to two communication devices which have the troubled spot therebetween.

11. The method for controlling a communication path of a communications network system according to claim 7, wherein the communication path in the unit network and the internetwork connection circuit are configured by an asynchronous transmission mode communication circuit.

12. The method for controlling a communication path of a communications network system according to claim 11, wherein a half of the entire band of the asynchronous transmission mode communication circuit is used to form a communication path of non-alternating route, and the other half of the band is used to form the alternate communication path.

* * * * *

UNITED STATES PATENT AND TRADEMARK OFFICE
CERTIFICATE OF CORRECTION

PATENT NO.     : 6,304,547 B1
DATED          : October 16, 2001
INVENTOR(S)    : Tsuruta et al.

Page 1 of 1

It is certified that error appears in the above-identified patent and that said Letters Patent is hereby corrected as shown below:

<u>Title page, Item [54], and Column 1, line 3,</u>
Title, change "THEREFOR" to -- THEREOF --.

Signed and Sealed this

Seventh Day of May, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,304,547 B1  Page 1 of 1
DATED : October 16, 2001
INVENTOR(S) : Tsuruta et al.

It is certified that error appears in the above-identified patent and that said Letters Patent is hereby corrected as shown below:

<u>Title page,</u>
Item [73], Assignee, change "Kaihsa" to -- Kaisha --.

Signed and Sealed this

Twenty-fourth Day of September, 2002

*Attest:*

*Attesting Officer*

JAMES E. ROGAN
*Director of the United States Patent and Trademark Office*